Jan. 5, 1954      L. W. CLOVER      2,665,087
LANDING WHEEL STRUCTURE FOR AIRCRAFT
Filed Nov. 2, 1950      3 Sheets-Sheet 1
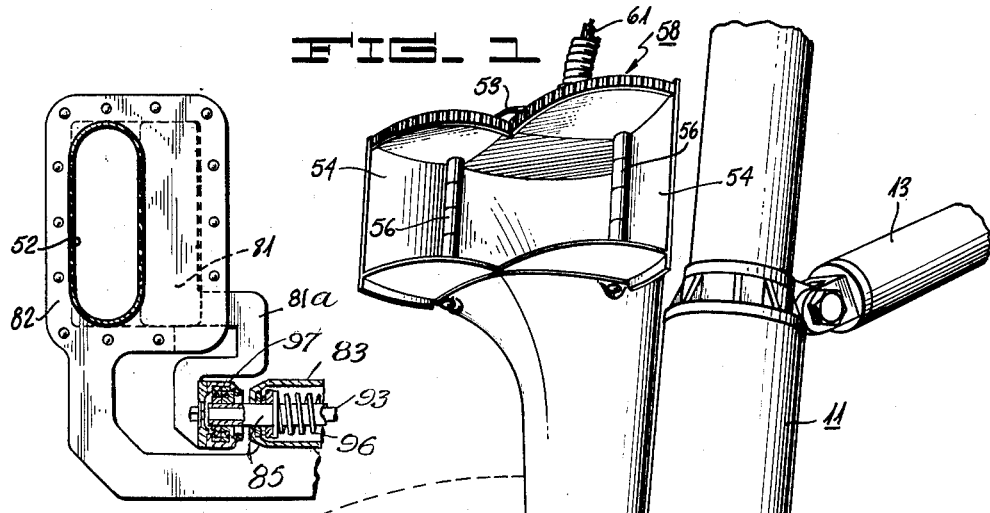
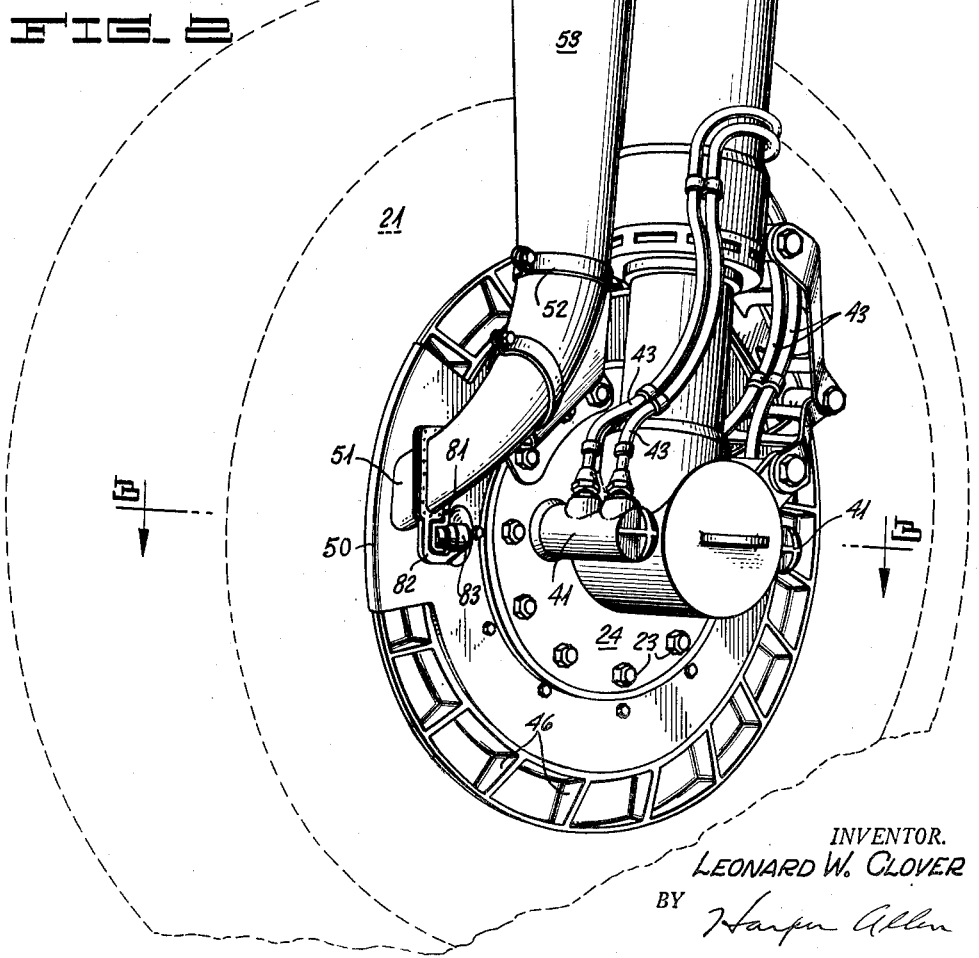
INVENTOR.
LEONARD W. CLOVER
BY
ATTORNEY

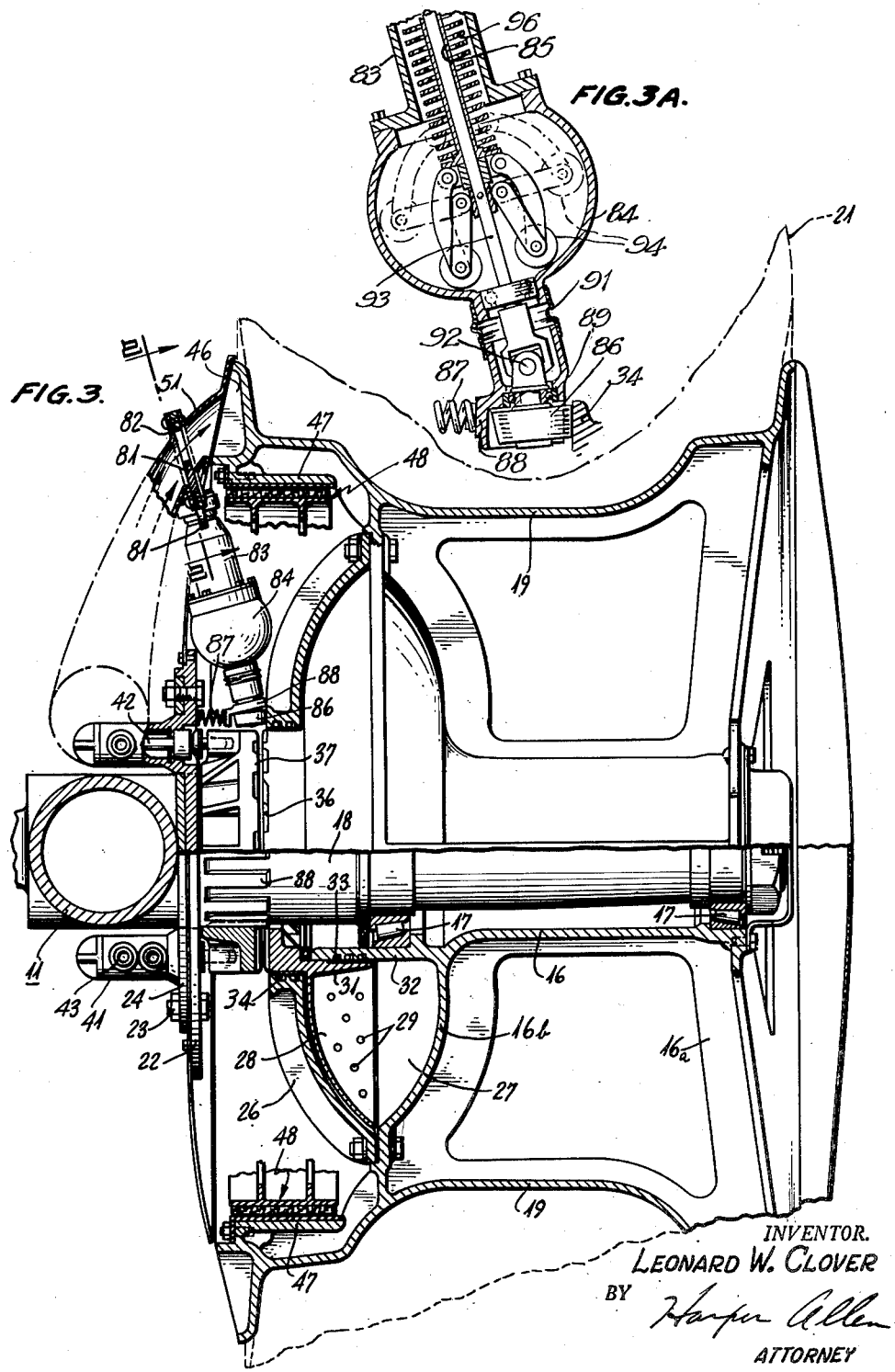

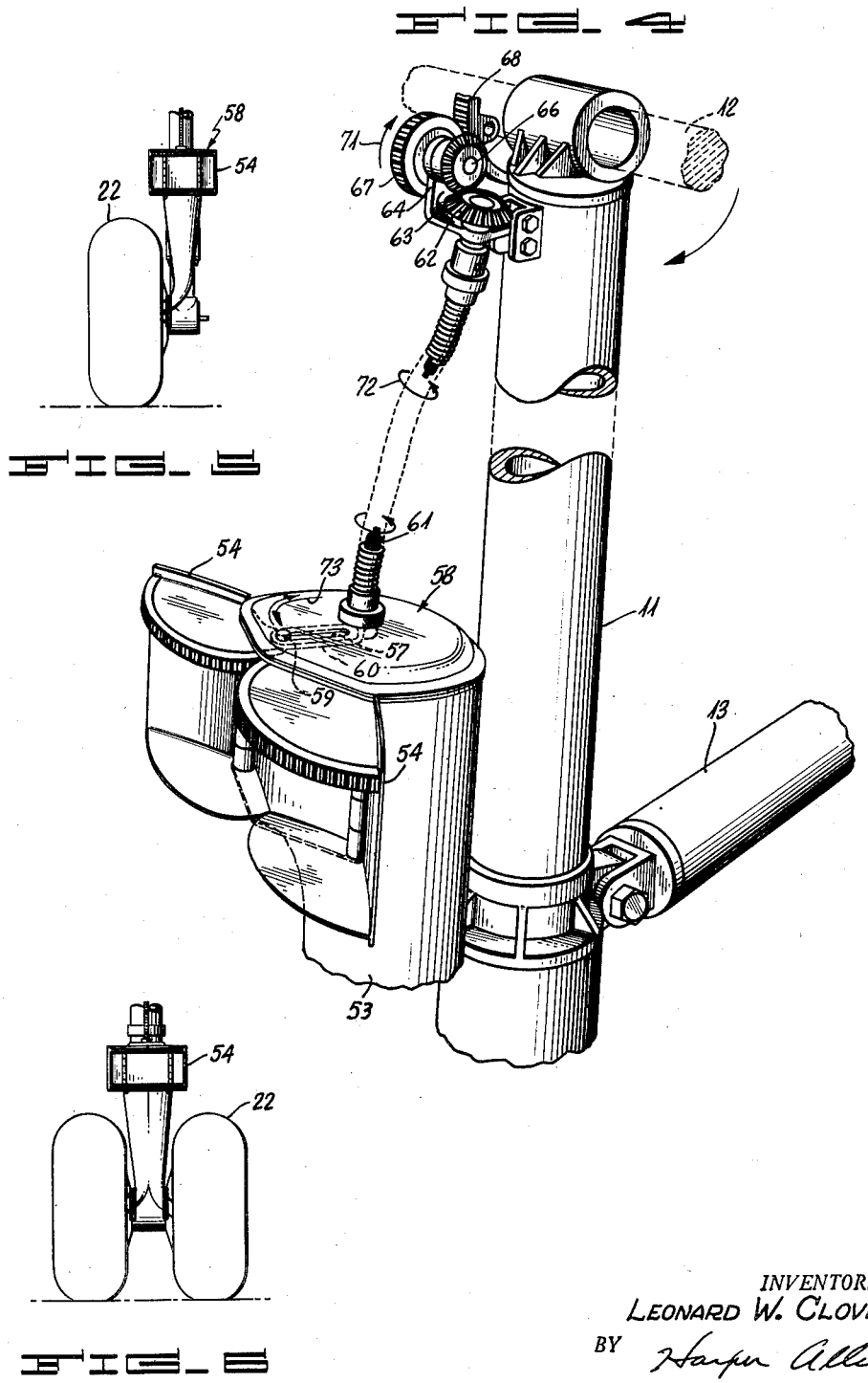

Patented Jan. 5, 1954

2,665,087

UNITED STATES PATENT OFFICE 2,665,087

LANDING WHEEL STRUCTURE FOR AIRCRAFT

Leonard W. Clover, San Jose, Calif.

Application November 2, 1950, Serial No. 193,562

3 Claims. (Cl. 244—103)

The present invention relates to landing wheels for aircraft and is concerned more particularly with a landing wheel which when moved from retracted to landing position is automatically brought up to the desired landing speed to avoid excessive wear on tires and also which has auxiliary brake means for slowing down the aircraft after landing together with means for cooling the wheel during the braking operation.

The landing wheel of the instant invention is designed to utilize the air velocity against which the aircraft is moving to effect acceleration of the landing wheel or wheels to the desired speed in relation to the speed of the aircraft in landing so as to avoid shock and skidding of the tires when contacting the earth upon landing. The landing wheel construction is such that the mechanism for accomplishing the above object folds away with the landing wheel in the retracted position thereof. The wheel is also provided with a fluid brake mechanism for slowing down the aircraft after the wheels contact the earth, applied under control of the pilot or from the cockpit. In connection with the braking of the aircraft, cooling of the wheel is provided through the same parts utilized for wheel acceleration.

The above and other objects of the invention will be apparent from the following description of a preferred embodiment thereof, as illustrated in the accompanying drawings, in which:

Figure 1 is a perspective view of a landing wheel embodying the instant invention.

Figure 2 is a detail view taken as indicated by the line 2—2 in Figure 3.

Figure 3 is a fragmentary sectional view taken on a plane indicated by the line 3—3 in Figure 1.

Figure 3A is a fragmentary enlarged view of the governor mechanism.

Figure 4 is a perspective view showing the connection and operation of the air vent openings in response to the opening of the landing wheel from retracted position.

Figure 5 is a front elevational view of the invention as embodied in a landing wheel of the single tire type.

Figure 6 shows the invention as embodied in a double wheel landing unit for heavier aircraft.

Referring to Figures 1, 3, and 4, there is shown a landing wheel construction of the retractible type including a wheel structure 10 carried by a landing wheel mounting strut 11, which is pivotally carried in the usual manner by a support shaft 12 on the frame structure of the aircraft, and has a control arm 13 connected thereto in the usual manner. The wheel structure 10 includes an integrally formed hub 16 which is journaled by respective bearings 17 on a stub axle 18 in the usual fashion. At one end the hub 16 has outwardly extending spokes 16a and at the other end a spoke structure in the form of a shell 16b. Both of the spoke structures 16a and 16b terminate in a rim structure 19 in which the tire 21 is held in the usual fashion. The stub axle 18 has an end flange 22 which is connected by suitable bolts 23 to a supporting flange 24 of the support strut 11.

To provide a fluid brake structure for the wheel the shell 16b of the spoke structure has bolted thereto a housing shell 26. Suitable fins 27 are formed within the shell 18 while the shell 26 houses a floating fin structure 28 which is perforated as at 29. The fin structure 28 is carried by a hub 31 having a portion journaled about the cylindrical extension 32 of the hub 16 of the wheel and sealed with respect thereto by respective seals 33. The outer portion of the hub 31 is journaled within the shell 26, and is sealed with respect thereto by suitable seals 34. The outer face of the hub 31 is formed with a series of clutch teeth 36 for cooperation with a clutch member 37 of the jaw type slidably and non-rotatively mounted by means of a spline connection 38 on the stub axle 18. The clutch member 37 is controlled for end-wise movement on the axle 18 by means of conventional hydraulic cylinder devices 41, having plungers 42 connected to the member 37 of the jaw clutch. The hydraulic cylinders 41 are of conventional construction and are each connected by respective sets of tubes 43 with a suitable valve control means in the cockpit of the aircraft. When the pilot desires to apply the fluid brake the cylinders 41 are operated so that their plungers move inwardly and engage the stationary jaw clutch 37, with the previously freely rotating jaw clutch member 36. In this way the fins 28, are held stationary with respect to the fins 27 of the wheel to perform a braking function.

As previously explained, the landing wheel structure is also provided with air means for cooling the brake mechanism of the wheel as well as providing for automatically controlled acceleration to and rotation of the wheel at a desired speed corresponding to the landing speed of the aircraft. For this purpose the rim structure 19 (Figure 3) is provided around one side thereof with a series of vanes 46 which are in heat conducting relationship with the rim 19 and the brake drum 47 of the conventional mechanical brake structure 48. To provide a controlled flow of air to the vanes 46, an air scoop is provided opening inside of a cover plate 50. The scoop includes an end section 51, immediately adjacent to the vanes 46 and a top section 53. The scoop section 53 flares outwardly at its upper end to provide a forwardly facing opening controlled by a pair of doors 54. The section 53 is carried by a clamping bracket 52 on the flange 24, and supports the end section 51.

Each door 54 (Figures 1 and 4) is hinged at 56, and the doors are connected by intermeshing segmental gears 58 carried thereon. One of the doors is provided with a pin 59, engaged by a slotted arm 60 pivoted at the top of the scoop housing 53, and connected to a flexible shaft 61. At its upper end the shaft 61 is connected to a bevel gear 62 mounted in a bracket 63, and this bevel gear 62, meshes with a bevel gear 64 on a transverse shaft 66 carried by the bracket 63. The shaft 66 carries a spur gear 67 which meshes with a segmental gear 68 on the pivot support shaft 12 for the landing wheel structure. In this manner when the landing wheel is moved from retracted to landing position the gear 67 is rotated in the direction of the arrow 71 in Figure 3, which in turn rotates the flexible shaft in the direction of the arrow 72, so that the arm 59, which drives the doors 54, is moved in the direction of the arrow 73 to the open position shown in the Figures 1 and 4. Also when the wheels are retracted an opposite movement occurs so that the doors 54 are closed.

It is seen that the scoop 53 forms a structure providing for high velocity flow of air against vanes 46, and this flow of air is controlled to provide the desired speed of rotation of the landing wheel for the landing speed of the aircraft. For this purpose a slidable gate 81 (Figure 2) is mounted in a flanged joint 82 of the two scoop sections 51 and 53, and the gate 81 is connected by an extension 81a to a conventional form of fly wheel governor 83—84 (Figures 2 and 3). At its lower end the governor 83—84 is provided with a friction wheel 86 engaging the annular side surface of the hub 34, being spring-urged there against by means of a compression spring 87 seated between the flange 22 and a flange 88 of the housing 89. As seen in Figure 3A, the friction wheel 86 is journaled by a suitable bearing in a housing 89 which is connected by a flexible sleeve 91 with the governor housing. Also the wheel 86 has its shaft connected by a universal joint 92 with the stationary drive shaft 93 of the governor.

The governor is of conventional form in its essential elements and includes conventional ball elements 94 which operate the sleeve 95 against the influence of the spring 96. As seen in Figure 2, the sleeve at its upper end has journaled thereon a collar 97 to the upper end of which the extension 81a of the gate 81 is attached.

The arrangement is such that when the speed of the wheel 21 becomes excessive with respect to the desired landing speed, the gate 81 is moved to partially cut off the flow of air until the desired rotative landing speed of the wheel is obtained. Also, during braking, as the aircraft slows down the air passage means is opened to its full extent by the governor. It will be noted that because of the mounting of the friction wheel 86 and the influence of the spring 87, wear does not affect the operation.

While I have shown and described a preferred form of the invention, it is capable of variation and modification so that its proper scope should be had by reference to the claims appended hereto.

I claim:

1. In a landing wheel structure for aircraft, a wheel support, a landing wheel journalled thereon including a tire-supporting rim, a series of substantially radially extending vanes on said rim, air passage means on said structure having an outlet directed toward and disposed adjacent said vanes to effect impingement of air thereon and an inlet facing in the direction of travel of the aircraft, a gate mounted in said air passage means for opening and closing movement with respect thereto, governor means mounted on said structure and controlled by said wheel upon rotation thereof, and means operatively interconnecting the governor and said gate for controlling the rate of air flow through the passage inversely to the rate of wheel rotation.

2. In a landing wheel structure for aircraft, a wheel support, a landing wheel journalled thereon including a tire-supporting rim, air passage means on said structure having an outlet directed toward and disposed adjacent said rim and an inlet facing in the direction of travel of the aircraft, a gate mounted in said air passage means for opening and closing movement with respect thereto, governor means mounted on said structure and controlled by said wheel upon rotation thereof, and means operatively interconnecting the governor and said gate for controlling the rate of air flow through the passage inversely to the rate of wheel rotation.

3. In a retractible landing wheel structure for aircraft, a wheel-supporting strut mounted for movement between retracted and extended positions, an axle carried by said strut, a landing wheel journalled on said axle and having a rim carrying a series of vanes, air passage means carried by said strut in fixed relation therewith having an inlet end facing in the direction of travel of the aircraft and having a discharge end for directing air against said vanes, a gate mounted in said air passage means for opening and closing said air passage means, governor means driven by said wheel, and means operatively interconnecting the governor and said gate for controlling the rate of air flow through the passage inversely to the rate of wheel rotation.

LEONARD W. CLOVER.

References Cited in the file of this patent
UNITED STATES PATENTS

| Number | Name | Date |
|---|---|---|
| 2,014,339 | Messier | Sept. 10, 1935 |
| 2,365,126 | Vickers | Dec. 12, 1944 |
| 2,372,207 | Kendrick | Mar. 27, 1945 |
| 2,381,842 | Schwend | Aug. 7, 1945 |
| 2,400,587 | Livers | May 21, 1946 |
| 2,466,568 | Bean | Apr. 5, 1949 |
| 2,594,202 | Necchi | Apr. 22, 1952 |